United States Patent Office 3,393,704
Patented July 23, 1968

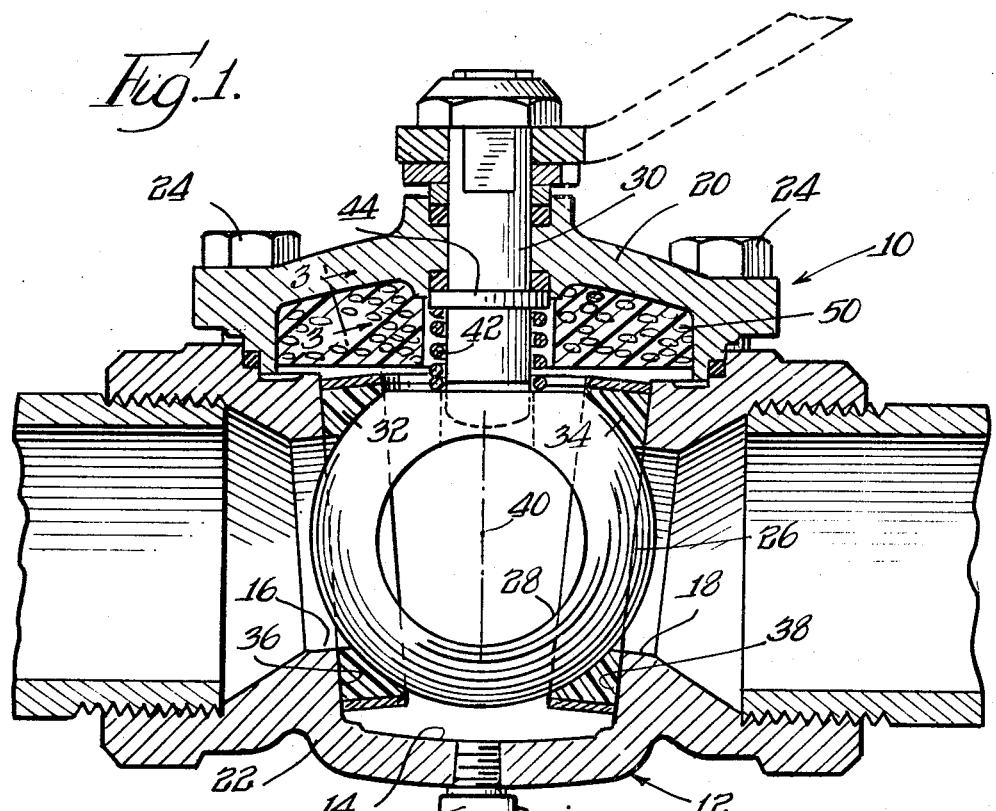
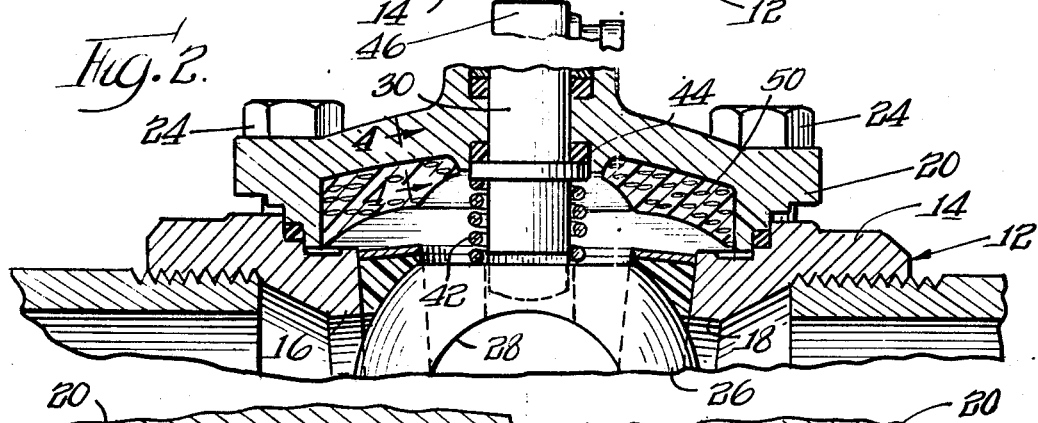
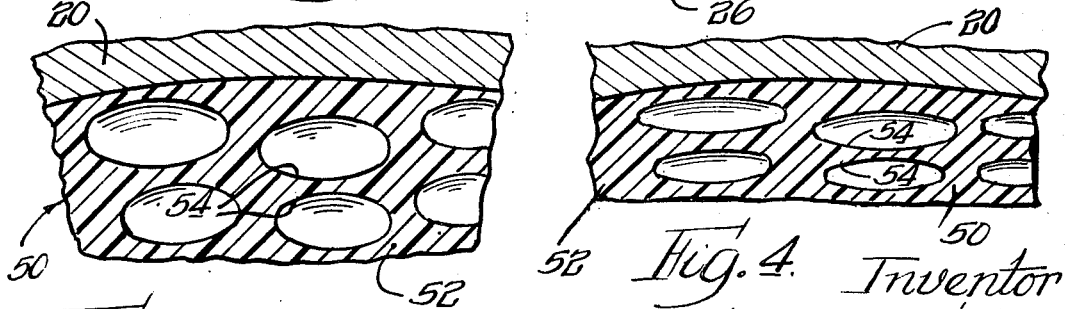

3,393,704
BALL VALVE
Rolland McFarland, Jr., Crystal Lake, Ill., assignor to Hills-McCanna Company, Carpentersville, Ill., a corporation of Illinois
Filed June 10, 1966, Ser. No. 556,631
6 Claims. (Cl. 137—593)

The present invention relates to ball valves.

One object of the invention is to provide a new and improved ball valve which is capable of providing a long, trouble free service life even when used in environments which subject the valve, in its closed position, to marked and even extreme increases in temperature, the valve providing double protection against leakage through the valve, when the valve is closed, by virtue of effective leak-free sealing of the valve on both the upstream side and the downstream side of the valve ball.

More specifically stated, another object of the invention is to provide an improved ball valve which operates when closed to effectively seal off the transmission of fluid on both the upstream and downstream side of the ball and to absorb any thermal expansion of liquid trapped in the closed valve thereby avoiding the development of damaging internal pressure when the valve is subjected to increased temperature after being closed.

Another object is to provide a new and improved ball valve which affords the advantages of both an effective immunity to damage by excessive internal fluid pressure due to a change in temperature after the valve is closed and a most effective sealing of the valve on both the upstream and downstream sides of the ball by means of seats engaging the ball and supported slidably on seat support surfaces oriented in converging relation to each other so that the valve is tightened by movement of the valve ball and seats in the direction in which the seat support surfaces converge.

Another object is to provide a new and improved valve of the above character which affords the advantages of having an effective immunity to damage by excessive internal pressure arising from thermal expansion of fluid trapped in the valve after the valve is closed while, at the same time, affording the advantage of economical manufacture using in its construction, without modification, the valve body and working parts of a conventional valve which is subject to damage by thermal expansion of fluid trapped in the valve.

Other objects and advantages will become apparent from the description of the exemplary embodiment illustrated in the drawings, in which:

FIG. 1 is a longitudinal sectional view of a ball valve forming the preferred embodiment of the invention, the valve being illustrated in its closed condition with substantially atmospheric pressure prevailing within the valve;

FIG. 2 is a fragmentary sectional view of the upper portion of the valve illustrated in FIG. 1 and illustrating the condition of a pressure absorbing element in the valve when the valve is initially closed with a normal operating pressure prevailing within the valve;

FIG. 3 is a fragmentary sectional view on a greatly enlarged scale taken along the line 3—3 of FIG. 1 and showing the cellular construction of an expansion absorbing element incorporated within the valve; and FIG. 4 is a fragmentary sectional view on a greatly enlarged scale similar to FIG. 3 taken along the line 4—4 of FIG. 2 and showing the expansion absorbing element contracted by the normal operating pressure within the valve.

Referring to the drawing in greater detail, the ball valve 10, forming the preferred embodiment of the invention illustrated, comprises a valve body 12 defining an internal valve chamber 14 and two flow passages 16, 18 opening into opposite sides of the chamber, as shown. The body 12 includes, on its upper side, a bonnet 20 removably secured to the main section 22 of the valve body by bolts 24. Removal of the bonnet 20 provides convenient access to all the internal parts of the valve for inspection and servicing, as this may be desired.

A flow control ball 26 defining a flow passage or bore 28 extending therethrough is rotated between an open valve position and a closed valve position by an operating stem 30 journalled in and sealed continuously with the valve bonnet 20.

Double protection against the leakage of fluid through the valve, when the ball 26 is turned to its closed valve position illustrated in FIG. 1, is provided by effective seals formed between the valve body 12 and the ball 26 on both the upstream and downstream sides of the ball. The valve 10 is so designed that both these seals, on the upstream and downstream sides respectively of the ball, are most effective at all times.

For this purpose, the ball 26 is sealed to the valve body 12 on opposite sides of the ball by two annular seats 32, 34 disposed in encircling relation to the inner ends of the respective passages 16, 18 and slidably mounted on two substantially flat seat support surfaces 36, 38.

The seat support surfaces 36, 38 are both formed on the body 12 in encircling relation to the respective passages 16, 18 and have a converging relation to each other in a direction transverse to seat passages 16, 18. In the valve shown, the direction of convergence of the seat support surfaces 36, 38 is coincident with the axis 40 about which the ball 26 is rotated by the stem 30 and for this reason, the direction of convergence of the seat support surfaces is, for convenience, identified in FIG. 1 by the same line 40.

The ball 26 and seats 32, 34 are continuously urged in a direction of convergence of the seat support surfaces 36, 38 by a helical compression spring 42 encircling the inner end of the stem 30 between an inner annular shoulder 44 on the stem and the ball 26, the ball 26 being free to move axially in relation to the stem 30.

As a consequence, when the ball is turned to its closed valve position illustrated in FIG. 1 with opposite ends of the ball bore or passage 28 turned away from the passages 16, 18, the valve seats 32, 34 form fluid-tight seals with both the seat support surfaces 36, 38 and with opposite sides of the ball. In the event either or both of the seats 32, 34 are reduced in thickness by wear or deformation, the spring 42 urges the ball 26 and seats in the direction of convergence of the seat support surfaces 36, 38 to immediately compensate for the reduced thickness of the seats and maintain the effectiveness of the valve to form fluid-tight seals on both the upstream and downstream sides of the ball when the valve is closed.

The advantages of having the valve sealed against leakage of fluid therethrough on both the upstream and downstream sides of the ball are highly valued, particularly in some environments. FIG. 1 illustrates the manner in which a stop cock or test valve 46 may be installed in the main body section 22 to drain fluid from the bottom of the internal valve chamber 14 when the valve is closed. Opening of the test valve or stop cock 46, when the main valve is closed, is a test procedure used to check the fluid tightness of the sealing of the valve on both the upstream and downstream sides of the ball when the valve is closed. When the ball is effectively sealed on both the upstream and downstream sides, when turned to its closed valve position, no fluid can enter the inner chamber 14 from either of the passages 16, 18 and no fluid will drain from the open test valve 46 after the chamber 14 is initially emptied. When the valve 10 is in service, the test valve 46 is normally closed. The optional installation and use of the test valve 46 in the main valve 10 is mentioned to illustrate the importance and advantages of effective sealing of the ball on both its upstream and downstream sides by means of valve seats 32, 34.

When the valve 10 is in service, the space within the internal chamber 14, not occupied by valve structure, is completely filled with liquid which flows into the chamber 14 when the valve ball is being turned between its open and closed valve positions.

A typical valve 10 may be installed in environments where it is, at times, exposed to intense heating, for example, outdoors where the valve is exposed to the hot sun during the day. In such an environment, the valve 10 may be closed while the valve and the fluid in the valve are relatively cool, because of the relatively low temperature of the fluid previously flowing through the valve or on account of the valve not being subjected to significant heat from the environment. For instance, the valve, when installed in a sunny environment, may be closed at night or in the morning when the valve and the fluid within the valve are cool.

Because of the effective sealing of the ball on both its upstream and downstream sides, when the valve is closed, the fluid trapped in the chamber 14 upon closure of the valve cannot escape from the chamber 14 back into either of the passages 16, 18. With fluid trapped in the chamber 14, as indicated, the valve may be subjected to intense heat from the environment, as, for example, being exposed to direct radiant heat from the sun. When this occurs, the valve becomes a miniature "boiler," with the fluid trapped in the chamber 14 undergoing thermal expansion within the confines of the chamber 14.

Such thermal expansion of the entrapped liquid has been a troublesome source of damage to valves of the character described. The rising pressure within the valve chamber 14 in relation to the normal line pressures in the passages 16, 18 tends to increase the force on the ball 26 urging it in the direction 40 in which the seat support surfaces 36, 38 converge. The accompanying wedging of the ball 26 and seats 32, 34 between the converging seat support surfaces 36, 38 can subject the seats 32, 34 to sufficient pressure to cause deformation and damage of the structure, particularly the seats.

The intense internal pressure due to thermal expansion of fluid trapped in the chamber 14 has been destructive to other components of valves of the character described. For example, in conventional valves of this design, the valve bonnets 20 have been cracked by the pressure of trapped fluid heated in the valve. In other instances, the bolts 24 used to secure together major components of the valve body have been stretched by the force of internal pressure applied by the trapped fluid being heated. In a sense, the problem of excessive internal fluid pressures arising is an accompaniment of the great effectiveness of the valve structure described to provide effective seals on both the upstream and downstream sides of the valve ball.

The improved valve 10, embodying the invention, affords the advantages of leak-free sealing of the valve ball on both its upstream and downstream sides while, at the same time, providing an effective immunity to damaging of the valve structure by the action of trapped fluid heated within the closed valve, for example, by the rays of the sun.

Having reference to FIG. 1, an expansion absorbing element 50 is encased in the valve body 12 and exposed to fluid in the valve chamber 14 for reversible compression by the expansion of fluid trapped and heated in the chamber 14 when the ball is turned to its closed valve position. The expansion absorbing element 50 is resiliently compressible and has an overall volumetric displacement which varies inversely with the ambient fluid pressure on the element 50.

A most practical and advantageous expansion absorbing element can be formed by a yieldable polymeric material forming a matrix within which is contained and sealed a multiplicity of cells filled with gas. In FIGS. 3 and 4, the matrix is identified by the number 52 and the cells are identified by the number 54. The matrix 52 containing the multiplicity of sealed gas cells 54 may be visualized as having the construction of a "sponge." The matrix 52 may be formed from any one of a number of yieldably plastics materials such, for example, as polyurethane, styrene and well known plastics sold commercially under the trademarks "Hycar," "Teflon," and "neoprene." The formation of sponge structure from such plastics materials to produce a yieldable matrix containing multitudinous sealed gas chambers can be readily accomplished by those skilled in the plastics art. In a general way, plastics materials for forming "sponges" are compounded with suitable ingredients which produce the gas entrapped in the matrix and create the plenum spaces containing gas.

As indicated, the art of compounding plastics materials and processing the materials to produce such sponge structures is well known in the plastics art and need not be described in detail here.

The expansion absorbing element 50 is placed in the internal chamber 14 adjacent the inner surface of the bonnet 20 as shown in FIG. 1. Preferably, the element 50 encircles the stem 30 in adjacent relation to the bonnet surface. It may be produced as a separate element that is assembled with other parts in the chamber 14 or it can be produced in adhering relation to the bonnet 20 by plastics material placed in fluid form on the inner surface of the bonnet and processed to produce the sponge-like construction desired in the element 50.

When the chamber 14 is under atmospheric pressure, a condition illustrated in FIG. 1, the expansion absorbing element 50 expands to its full size, illustrated in cross section in FIG. 1.

When normal line pressure is introduced into the chamber 14 and the valve is closed, as illustrated in FIG. 2, the compressible expansion absorbing element 50 is contracted in volume by the fluid pressure applied to the element 50. This contraction of the element 50 under pressure is accompanied by a corresponding contraction of the gas-filled plenum space 54 within the element 50. Contraction of the plenum space 54, more particularly the sealed individual spaces 54, by the fluid pressure within the chamber 14 is illustrated in FIG. 4, which contrasts with FIG. 3 showing the spaces 54 having larger size when subject to less pressure. The gas pressure in the contracted plenum space or spaces 54 approximates the pressure within the chamber 14.

Upon heating and consequent thermal expansion of the liquid trapped within the chamber 14, the plenum space 54 within the expansion absorbing element 50 is capable of contracting still further in volume to provide clearance for the increased volume of the liquid due to thermal expansion of the liquid. As a consequence, the fluid trapped and heated in the closed valve, which can become a virtual "boiler," can expand within the chamber 14 without building up damaging internal pressure. The increase in pressure due to heating of the liquid trapped in the chamber 14 is limited to that required to contract the gas-filled plenum space 54 sufficiently to accommodate the increased volume of liquid. The accommodation of the increased volume of liquid and the consequent limitation on the build up of pressure serves to avoid damaging pressures within the valve.

Upon opening of the valve, the limited elevated pressure within the chamber 14 is immediately released through the passages 16, 18 with consequent expansion of the expansion absorbing element 50 to its normal volume for the line pressure to which it is subjected.

The cyclic action described will automatically repeat endlessly, as required, to provide continuous protection of the valve over a long service life against damage from excessive internal pressure on account of thermal expansion of fluid trapped in the valve. While specific reference has been made to thermal expansion of fluid in the valve incident to heating of fluid trapped in the valve, it will be understood that some liquids which may be trapped in the valve in service will expand as an incident to lowering of the temperature sufficiently to cause the liquid to freeze.

It will be appreciated that the invention is not necessarily limited to use of the particular valve construction illustrated, but includes the use of modifications within the spirit and scope of the invention as defined by the following claims.

I claim:

1. A double sealed ball valve for use in environments which subject the valve, in its closed condition, to marked changes in temperature; comprising, in combination, a valve body encasing an internal valve chamber and defining two flow passages opening into opposite sides of the chamber, two seat support surfaces encircling the inner ends of said respective passages and having a converging relation to each other in a predetermined direction transverse to said passages, two valve seats slidably supported on said respective seat support surfaces, a flow control valve ball rotatably disposed in said chamber in slidable engagement with said seats, resilient means urging said ball and said seats in said direction in which said seat support surfaces have a converging relation, a reversibly compressible expansion absorbing element defining compressible plenum space filled with gas and sealed, and said expansion absorbing element being encased by said body and exposed to fluid in said chamber around said ball for reversible compression by the thermal expansion of fluid trapped in said chamber when the ball is turned to its closed valve position with said ball bore sealed off from communication with both said flow passages by the coaction of said seats with said ball.

2. A double sealed ball valve for use in environments which subject the valve to marked changes in temperature, comprising, in combination, a valve body encasing an internal valve chamber and defining two fluid passages opening into opposite sides of the chamber, two seat support surfaces encircling the inner ends of said respective passages and having a converging relation to each other in a predetermined direction transverse to said passages, two valve seats slidably supported on said respective seat support surfaces, a flow control valve ball rotatably disposed in said chamber in engagement with said seats, and an expansion absorbing element reversibly contractible in volume by applied fluid pressure, and said expansion absorbing element being encased by said body and exposed to fluid in said chamber for reversible contraction in volume by the thermal expansion of fluid that is trapped in said chamber around said ball and sealed off from said passages by the coaction of said valve seats with said ball.

3. A ball valve according to claim 2 in which said expansion absorbing element comprises a matrix of yieldable polymeric material within which is contained and sealed a multiplicity of cells filled with gas.

4. A double sealed ball valve for use in environments which subject the valve to marked variations in temperature, comprising, in combination, a valve body defining an internal valve chamber and two flow passages opening into said chamber, two valve seats encircling the inner ends of said respective passages, a flow control ball having a flow bore therein and being rotatably disposed within said chamber in engagement with said seats, means coacting with said ball to rotate the latter between open valve and closed valve positions thereof, a reversibly compressible expansion absorbing element having an overall volumetric displacement which varies inversely with the ambient fluid pressure on the element, and said expansion absorbing element being encased by said body to occupy a variable volume of the space occupied by fluid trapped around said ball by the coaction of said seats with the ball.

5. A ball valve according to claim 4 in which said reversibly compressible expansion absorbing element comprises a body of yieldable polymeric material containing sealed plenum space filled with gas.

6. A double sealed ball valve for use in environments which subject the valve to marked variations in temperature, comprising, in combination, a valve body defining an internal valve chamber and two flow passages opening into said chamber, two valve seats encircling the inner ends of said respective passages, a flow control ball having a flow bore therein and being rotatably disposed within said chamber in slidable engagement with said seats, means coacting with said ball to rotate the latter between an open valve position thereof in which the ball bore communicates with said passages and a closed valve position in which said ball bore and said chamber are sealed off from communication with both said passages by the coaction of said seats with said ball, a reversibly compressible expansion absorbing element defining compressible plenum space filled with gas and sealed; and said expansion absorbing element being disposed in said chamber to provide, by contraction under fluid pressure, space for accommodating thermal expansion of fluid trapped in said chamber.

References Cited

UNITED STATES PATENTS 2,968,318   1/1961   Bauman _____ 138—26
3,168,279   2/1965   Anderson et al. _____ 251—315

FOREIGN PATENTS 936,929   9/1963   Great Britain.

M. CARY NELSON, *Primary Examiner.*

W. R. CLINE, *Assistant Examiner.*